(No Model.) 2 Sheets—Sheet 1.
R. J. BLAKE.
COMBINED TRUCK, BAG HOLDER, SCALE, AND LIFTING APPARATUS.
No. 533,410. Patented Jan. 29, 1895.
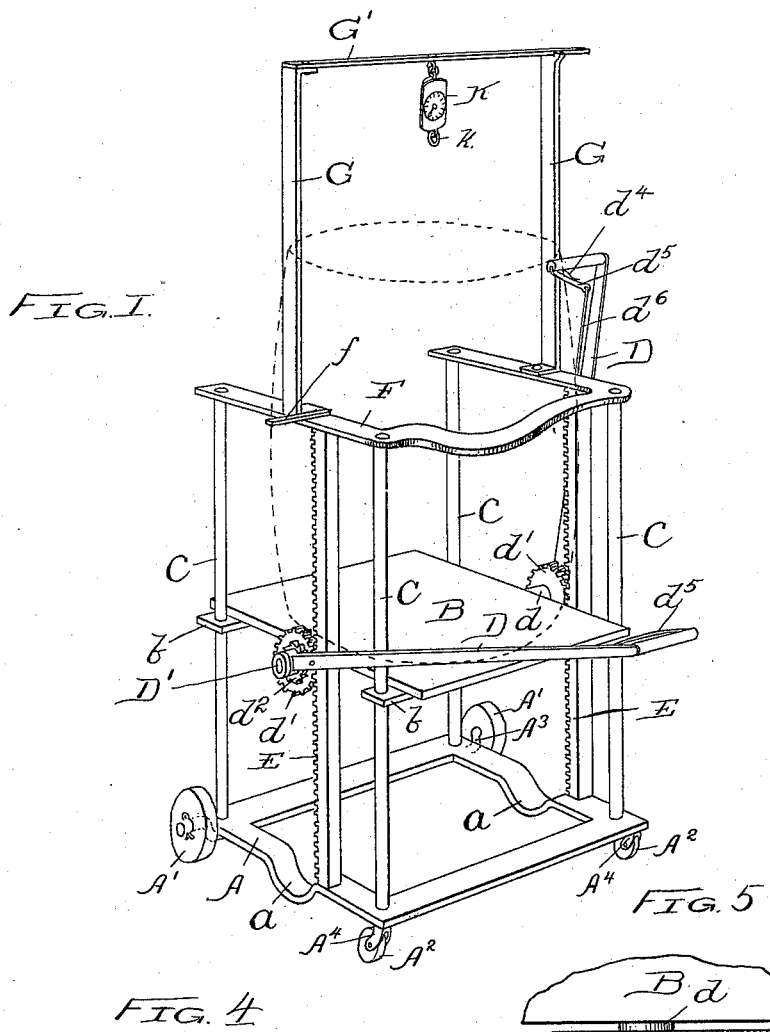
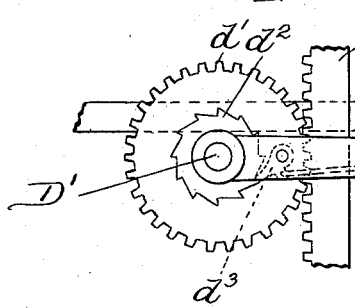
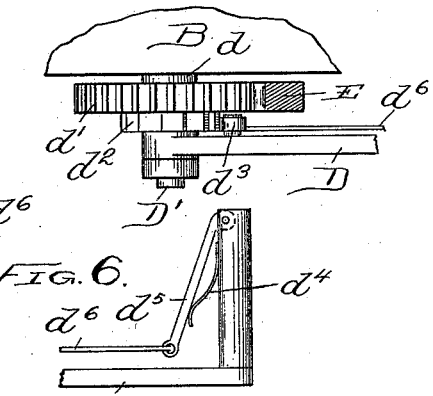
WITNESSES:
Sew E. Curtis
H. W. Munday
INVENTOR:
ROBERT J. BLAKE
By Munday, Evarts & Adcock,
HIS ATTORNEYS.
THE NORRIS PETERS CO., PHOTO-LITHO., WASHINGTON, D. C.

(No Model.) 2 Sheets—Sheet 2.

R. J. BLAKE.
COMBINED TRUCK, BAG HOLDER, SCALE, AND LIFTING APPARATUS.

No. 533,410. Patented Jan. 29, 1895.

WITNESSES:
Sew. E. Curtis

INVENTOR:
ROBERT J. BLAKE
By Munday, Evarts & Adcock,
HIS ATTORNEYS

UNITED STATES PATENT OFFICE.

ROBERT J. BLAKE, OF MAYWOOD, ILLINOIS, ASSIGNOR OF ONE-HALF TO CHARLES G. MARKLE AND DAVID G. MARKLE, OF SAME PLACE.

COMBINED TRUCK, BAG-HOLDER, SCALE, AND LIFTING APPARATUS.

SPECIFICATION forming part of Letters Patent No. 533,410, dated January 29, 1895.

Application filed May 14, 1894. Serial No. 511,166. (No model.)

*To all whom it may concern:*

Be it known that I, ROBERT J. BLAKE, a citizen of the United States, residing in Maywood, in the county of Cook and State of Illinois, have invented a new and useful Improvement in a Combined Truck, Bag-Holder, Scale, and Lifting Apparatus, of which the following is a specification.

My invention relates to or is a combined machine or apparatus designed for use as a truck to move various articles about, as a scale for weighing them, as a lifting mechanism for elevating them as into wagons, as a bag holder in filling bags, and for other analogous uses.

My invention consists in the novel construction of parts and devices and novel combinations of parts and devices herein shown and described and more particularly pointed out in the claims.

Figure 2:
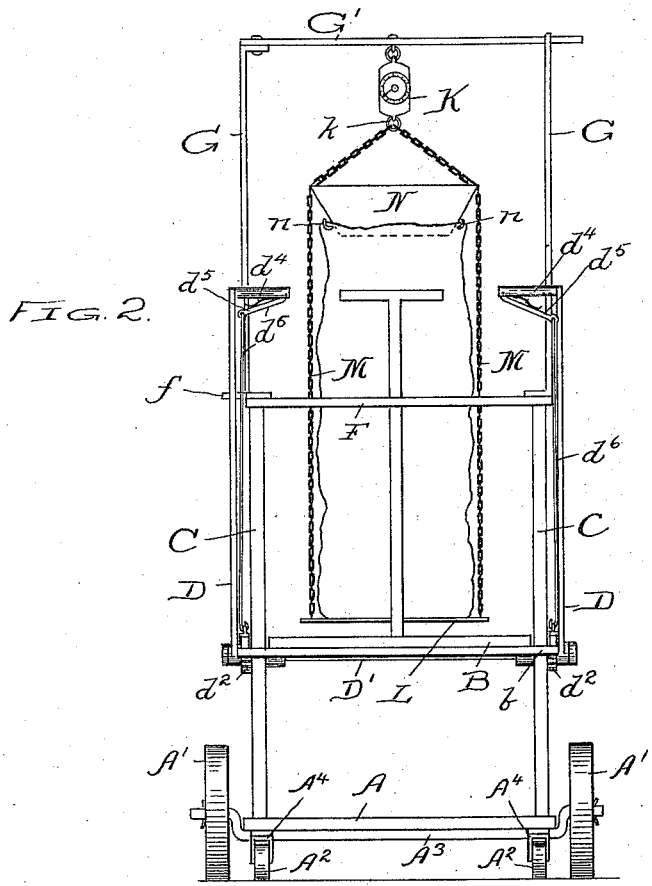
Figure 3:
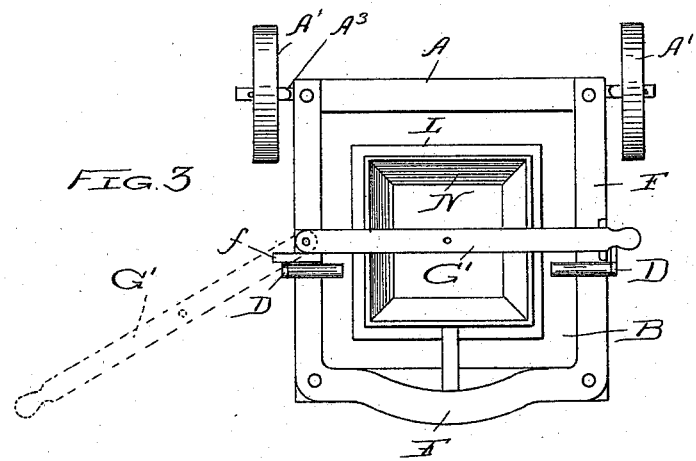

In the accompanying drawings forming a part of this specification, Figure 1 is a perspective view of a device embodying my invention, illustrating its use as a lifting machine. Fig. 2 is a front elevation, illustrating its use as a bag holder and weighing apparatus. Fig. 3 is a top or plan view. Fig. 4 is a detail side view of the pawl and ratchet lifting mechanism. Fig. 5 is a detail top or plan view of the parts shown in Fig. 4; and Fig. 6 is a detail view of parts hereinafter to be described.

In the drawings A represents the truck frame and A' A² the wheels of the truck. The front wheels A' of the truck are journaled upon a bent axle A³, and the rear wheels A² are journaled in the swivels or casters A⁴.

B is a platform which serves both as the platform of the truck and also as the platform of the lifting mechanism, the same being adapted to rest upon the truck frame A and also to slide up and down on the vertical guide rods or standards C C. The combined elevator and truck platform B is furnished with guides $b\,b$ having suitable holes therein to receive the guide bars C C.

D D are the lifting levers, the same being journaled loosely on a shaft D' which is journaled in suitable bearings $d$ on the platform B. This shaft D' is provided with gears $d'\,d'$ which are rigidly secured thereto, and also with ratchets $d^2\,d^2$ fixed to the gears. Pawls $d^3$ on the levers D engage the ratchet, and thus serve to revolve the gears. The gears $d'$ engage vertical racks E E fixed to the truck frame A at their lower ends and to the top frame piece F at their upper ends. The frame piece F connects the upright rods or guide bars C C. The pawls $d^3$ are held in engagement with the ratchet by a spring $d^4$ acting against the lever $d^5$ which is connected by a rod $d^6$ with the pawl. The upper frame piece F is provided with a stop or projection $f$ against which one of the levers D may engage and thus serve to hold the combined truck and elevator platform B in any desired position.

G G are uprights secured to the upper frame F and provided with a pivoted cross bar G' extending between them, and from which the spring scale or weighing device K is supported.

The weighing platform L is supported from the scale ring $k$ by the chains M.

N is the combined bag holder and hopper, the same being provided with hooks $n$ to engage the upper or mouth end of the bag and support the same therefrom. The chains M support the bag holder N.

The truck frame A is provided with depressions $a\,a$ to give room for the shaft D' on the combined truck and elevator platform B.

The dotted lines in Fig. 1 represent a barrel.

By operating the lifting levers D D alternately, the platform is supported or held from falling by one of the lifting levers while the other is being moved to take a new hold. By using the two levers thus alternately the platform can be raised continuously.

I claim—

1. The combination with a truck frame A provided with upright guide bars C C, of the vertically sliding platform B furnished with guides $b$ fitting said guide bars, upright racks E E, lifting levers D D, shaft D' journaled on said platform B and provided with gears, engaging said upright racks E E, and with ratchets, said lifting levers having pawls engaging said ratchets, upper frame piece F, uprights G G having pivoted cross bar G', scale K supported from said cross bar, scale platform L, chains M, and combined bag holder and hopper N furnished with hooks *n*, all combined and operating substantially as specified.

2. The combination with the truck frame A furnished with wheels, of uprights C C, upright racks E E, vertically sliding platform B having a shaft journaled thereon furnished with two gears engaging said racks, and provided also with two ratchets and two lifting levers each of which is provided with a pawl for operating said ratchets, substantially as specified.

3. The combination with a wheeled truck furnished with uprights C C, of a vertically sliding platform B, a rack bar, a shaft furnished with a gear engaging said rack bar, and two lifting levers pivotally connected to said shaft and provided with pawls and two ratchets secured to said shaft and engaged by said pawls, said lifting levers being adapted to be operated alternately so that one may support and hold the platform while the other lever is being retracted to take a new hold, substantially as specified.

4. The combination with a wheeled truck furnished with upright guide bars C C, sliding platform B serving as a platform for the truck and also as a platform for the lifting mechanism, a lifting lever, D, and mechanism for operating said sliding platform by said lifting lever, substantially as specified.

5. The combination with a wheeled truck frame furnished with upright guide bars C C, sliding platform B serving as a platform for the truck and also as a platform for the lifting mechanism, a lifting lever D, mechanism for operating said sliding platform by said lifting lever, uprights G, pivoted cross bar G', and bag holding hopper N furnished with hooks *n* supported from said cross bar G', substantially as specified.

6. The combination with wheel frame A of frame piece F, upright guide bars C C connecting said frames A and F, sliding platform B, operating levers D D, upright racks E E, shaft D', gears and ratchets on said shaft, spring actuated pawls on said levers D D, uprights G G, pivoted cross bar G' and scale K supported from said cross bar, substantially as specified.

7. The combination with uprights C C, of vertically sliding platform B having a shaft journaled thereon furnished with a gear, a rack bar engaged by said gear, a lifting lever pivoted loosely on said shaft and provided with a pawl and a ratchet secured to said shaft, substantially as specified.

ROBERT J. BLAKE.

Witnesses:
H. M. MUNDAY,
EDW. S. EVARTS.